(12) United States Patent
Vavintaparthi

(10) Patent No.: US 11,582,063 B2
(45) Date of Patent: Feb. 14, 2023

(54) NETWORK CONVERGENCE MECHANISM FOR RING NETWORKS

(71) Applicant: Cisco Technology, Inc., San Jose, CA (US)

(72) Inventor: Venkat Rao Vavintaparthi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 4 days.

(21) Appl. No.: 17/182,562

(22) Filed: Feb. 23, 2021

(65) Prior Publication Data

US 2022/0271973 A1 Aug. 25, 2022

(51) Int. Cl.
| | |
|---|---|
| H04L 1/00 | (2006.01) |
| H04L 12/423 | (2006.01) |
| H04L 12/42 | (2006.01) |
| H04L 43/0817 | (2022.01) |
| H04L 43/16 | (2022.01) |
| H04L 12/18 | (2006.01) |

(52) U.S. Cl.
CPC ............ *H04L 12/423* (2013.01); *H04L 12/18* (2013.01); *H04L 12/422* (2013.01); *H04L 43/0817* (2013.01); *H04L 43/16* (2013.01); *H04L 2012/421* (2013.01)

(58) Field of Classification Search
CPC ..... H04L 12/423; H04L 12/18; H04L 12/422; H04L 43/16; H04L 43/0817
See application file for complete search history.

(56) References Cited

U.S. PATENT DOCUMENTS

| | | | |
|---|---|---|---|
| 6,766,482 B1 * | 7/2004 | Yip | ........................ H04L 12/437 370/216 |
| 7,688,716 B2 * | 3/2010 | Pande | ...................... H04L 45/28 370/222 |

(Continued)

FOREIGN PATENT DOCUMENTS

| | | |
|---|---|---|
| CN | 101436975 | 8/2011 |
| CN | 102045231 | 6/2012 |

(Continued)

OTHER PUBLICATIONS

"Resilient Packet Ring", online: https://en.wikipedia.org/wiki/Resilient_Packet_Ring, Jul. 7, 2020, 3 pages, Wikimedia Foundation, Inc.

(Continued)

*Primary Examiner* — Abdelnabi O Musa
(74) *Attorney, Agent, or Firm* — Behmke Innovation Group LLC; Kenneth J. Heywood; Jonathon P. Western

(57) ABSTRACT

According to one or more embodiments of the disclosure, a particular networking device joins a ring network of networking devices that has a ring topology. The particular networking device monitors the ring network for a multicast frame used within the ring network to detect link failures. The particular networking device determines that a link in the ring network has failed, based on the particular networking device not receiving the multicast frame within a threshold amount of time. The particular networking device initiates repair of the ring network, when the particular networking device determines that the link in the ring network has failed.

20 Claims, 9 Drawing Sheets

(56) References Cited

U.S. PATENT DOCUMENTS

| | | | | |
|---|---|---|---|---|
| 8,355,348 | B1* | 1/2013 | Miller | H04L 12/42 370/256 |
| 2006/0245351 | A1* | 11/2006 | Pande | H04L 45/18 370/242 |
| 2011/0249551 | A1* | 10/2011 | Rollins | H04L 12/437 714/E11.073 |
| 2012/0195311 | A1* | 8/2012 | Gupta | H04L 45/22 370/390 |
| 2015/0207674 | A1* | 7/2015 | Wu | H04L 45/66 370/228 |
| 2017/0155575 | A1* | 6/2017 | Bertucci | H04L 12/42 |
| 2018/0139113 | A1* | 5/2018 | Jhu | H04L 12/437 |
| 2020/0228361 | A1* | 7/2020 | Jiang | H04L 45/16 |
| 2020/0336361 | A1* | 10/2020 | Nandy | H04L 12/437 |
| 2021/0211351 | A1* | 7/2021 | Lin | H04L 41/0672 |
| 2022/0272006 | A1* | 8/2022 | Saini | H04L 41/08 |
| 2022/0272129 | A1* | 8/2022 | Zhang | H04L 43/028 |

FOREIGN PATENT DOCUMENTS

| | | |
|---|---|---|
| CN | 102104521 | 6/2013 |
| CN | 106817254 | 1/2020 |

OTHER PUBLICATIONS

"REP Fast", online: https://www.cisco.com/c/en/us/td/docs/switches/lan/cisco_ie3X00/software/16_11/config/b_1611_IoT_scg/b_1611_IoT_scg_chapter_0111.pdf, May 1, 2019, 4 pages, Cisco.com.

"Ethernet Ring Protection Switching", online: https://en.wikipedia.org/wiki/Ethernet_Ring_Protection_Switching, May 29, 2020, 2 pages, Wikimedia Foundation, Inc.

"Resilient Ethernet Protocol Overview", online: https://www.cisco.com/c/en/us/support/docs/lan-switching/ethernet/116384-technote-rep-00.html, Jul. 22, 2016, 10 pages, Cisco.com.

"Ring Protocol MRP (IEC 62439-2)", online: https://www.perle.com/supportfiles/mrp.shtml, printed Jan. 21, 2021, 2 pages, Perle.com.

* cited by examiner

NETWORK CONVERGENCE MECHANISM FOR RING NETWORKS

TECHNICAL FIELD

The present disclosure relates generally to computer networks, and, more particularly, to a network convergence mechanism for ring networks.

BACKGROUND

Operational Technology (OT) networks are typically used to automate processes, such as factories, buildings, etc. Increasingly, OT networks are making use of networking devices that form a ring topology. Indeed, it is now common to see many rings of OT networks connecting various other ring networks or endpoint such as sensors, input/output (I/O) devices, and the like, through the ring topology and back to the enterprise. In general, ring topologies afford additional resiliency to the network, in the case of link failure.

When a link fails in a ring network, the amount of time taken by the network to identify the failure, and to redirect its traffic to avoid the failed link, is generally referred to as the convergence time for the ring network. In OT deployments, the convergence time can be a critical factor, as OT networks often support processes that require sub-second signaling. For instance, if a ring in an OT network conveys control commands to a particular actuator, a link failure in that ring may result in the actuator ceasing to function until the failure is detected and the network converges. With ring networks that include a large number of networking devices (e.g., Ethernet switches, etc.), the convergence time has been found to grow with each networking device that is added to the ring. This means that a network architect typically has to make a tradeoff between the size of the ring network and the convergence time that the ring is able to achieve.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
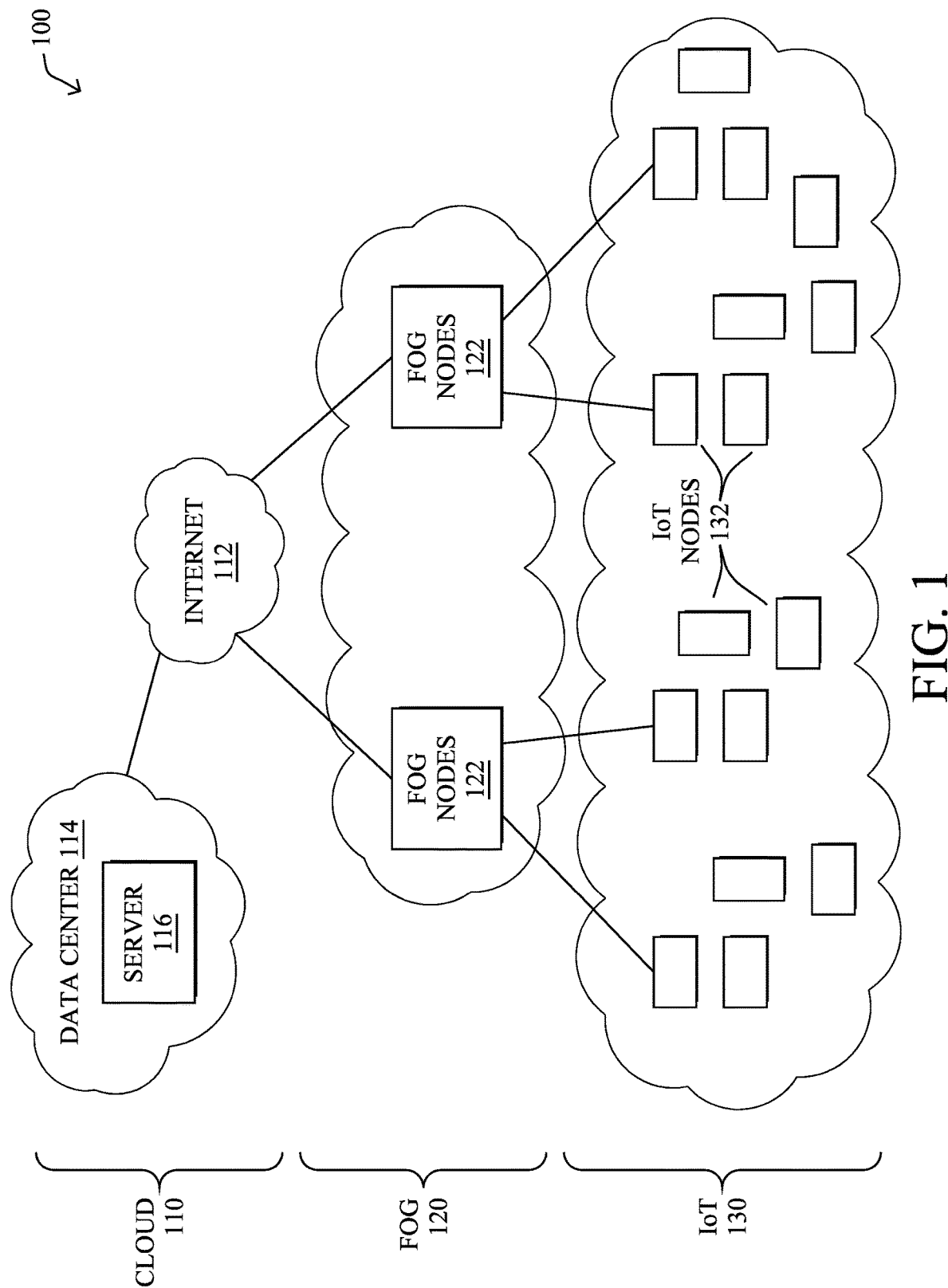
FIG. 1 illustrates an example network.

According to one or more embodiments of the disclosure, a particular networking device joins a ring network of networking devices that has a ring topology. The particular networking device monitors the ring network for a multicast frame used within the ring network to detect link failures. The particular networking device determines that a link in the ring network has failed, based on the particular networking device not receiving the multicast frame within a threshold amount of time. The particular networking device initiates repair of the ring network, when the particular networking device determines that the link in the ring network has failed.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
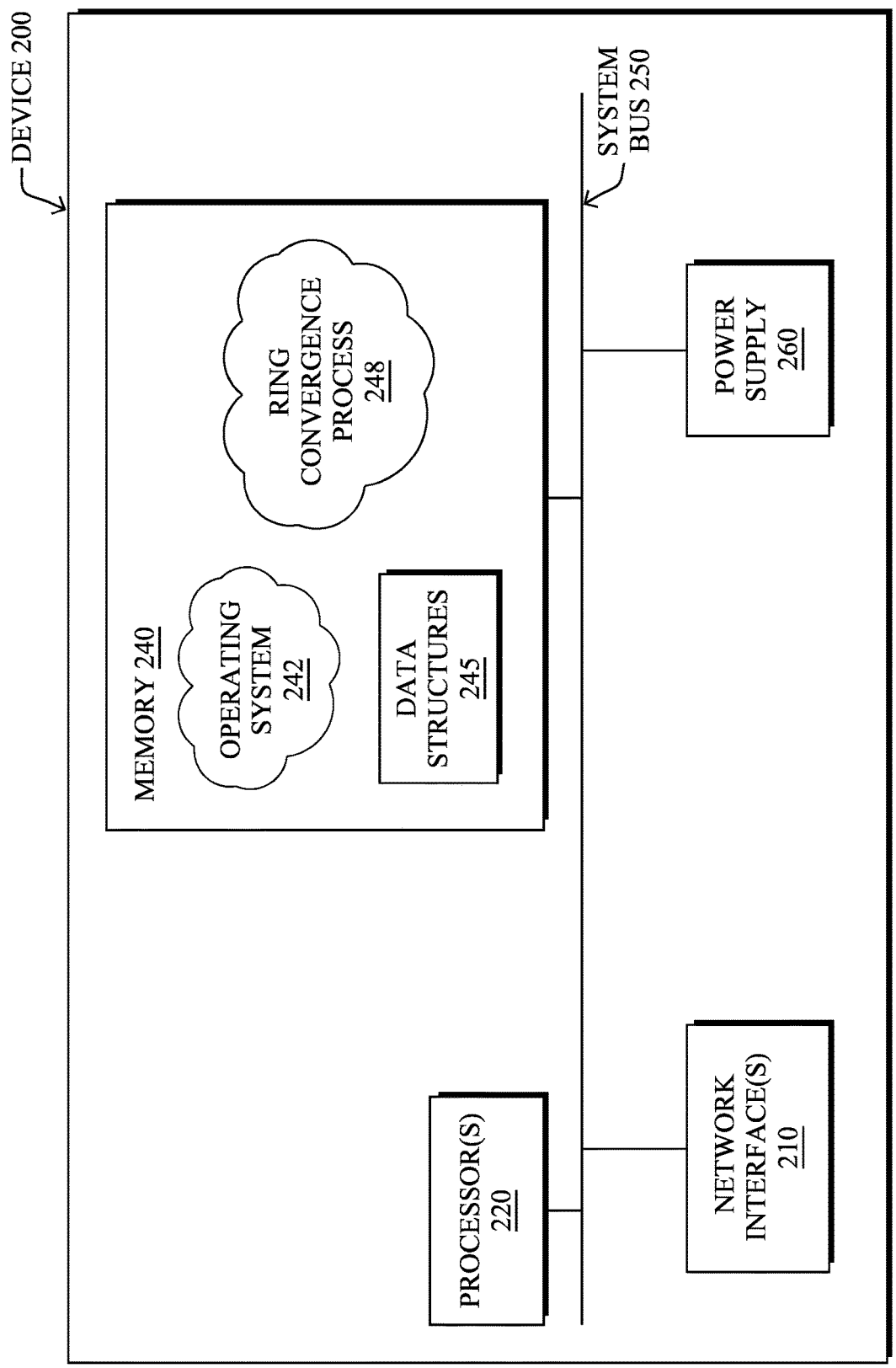
FIG. 2 illustrates an example network device/node.

FIG. 2 is a schematic block diagram of an example node/device 200 (e.g., an apparatus) that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.). In various embodiments, node/device 200 may take the form of a networking device, such as a switch, router, or the like.

Communication interface(s) 210 include the mechanical, electrical, and signaling circuitry for communicating data over a communication link. To this end, communication interface(s) 210 may be configured to transmit and/or receive data using a variety of different communication protocols, such as Ethernet, TCP/IP, UDP, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a ring convergence process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
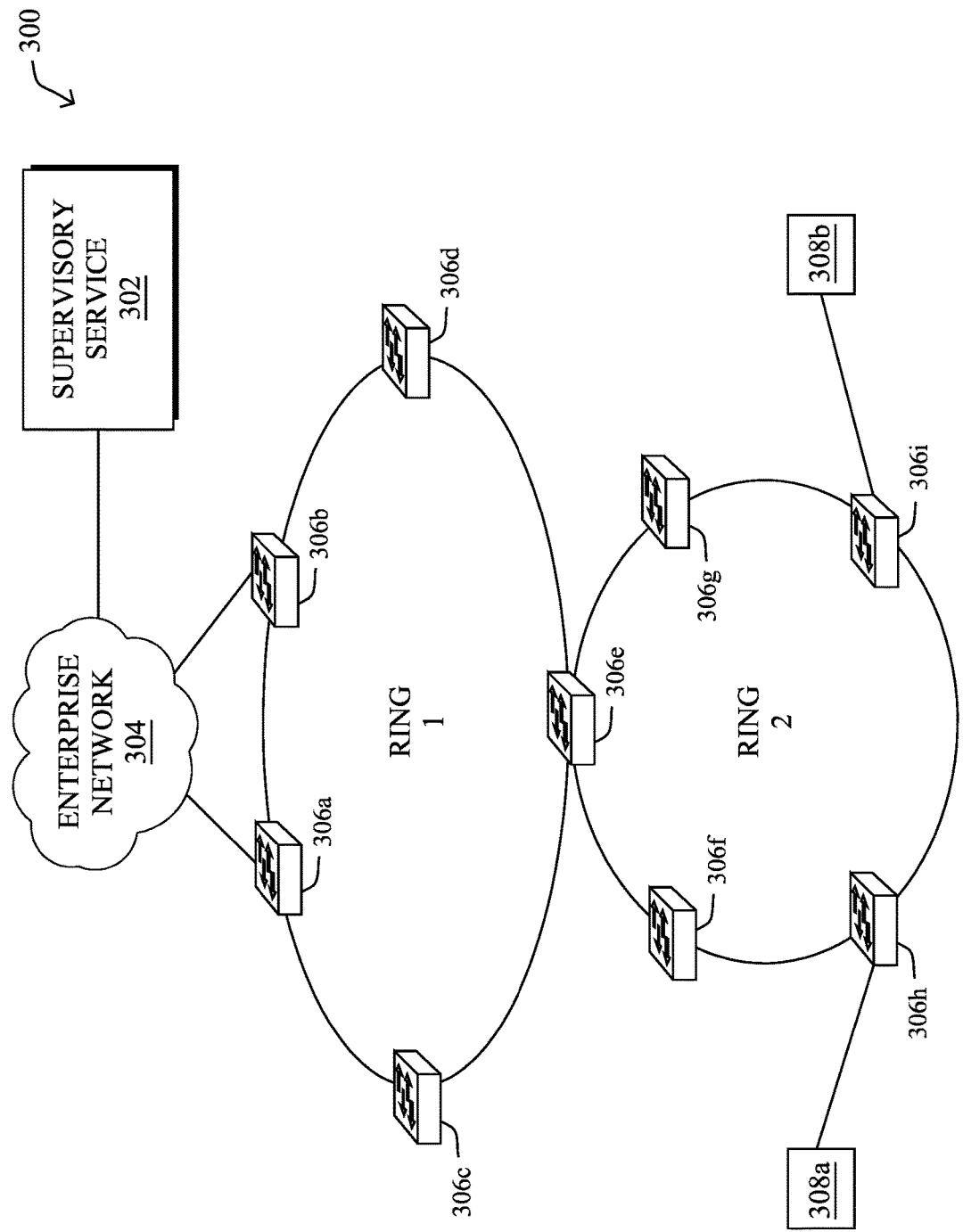
FIG. 3 illustrates an example network comprising ring networks.

As noted above, it is common in many Operational Technology (OT) networks to include networking devices (e.g., switches, routers, etc.) arranged in a ring topology, to connect to other rings and/or endpoints such as sensors, input/output (I/O) devices, and the like, thereby providing connectivity back to the enterprise. FIG. 3 illustrates an example network 300 that includes such rings, in one embodiment.

More specifically, as shown in FIG. 3, network 300 may comprise any number of networking devices 306, such as networking devices 306a-306i (e.g., Ethernet switches, etc.), which provide connectivity between endpoints 308, such as 308a-308b, and an enterprise network 304. For instance, endpoints 308a-308b may take the form of sensors, actuators, moving nodes (e.g., vehicles, mine carts, etc.), human-machine-interfaces, controllers, or the like.

In various embodiments, networking devices 306a-306i may form one or more rings (e.g., ring topologies). For instance, networking devices 306a-306e may form a first ring network, while networking devices 306e-306i may form a second ring network that is a sub-ring of the first ring.

In various embodiments, network 300 may also include a supervisory service 302 that provides supervisory control over the networking devices in network 300, such as 306a-306i. An example of such a supervisory service is Cisco Digital Network Architecture (Cisco DNA) by Cisco Systems, Inc. Such supervisory function may include, for example, any or all of the following, among others:

- Device Onboarding—here, supervisory service 302 may be responsible for overseeing the onboarding of any new devices to the network, such as assigning them to security groups, cataloging the new device, etc.
- Implementing Security Policies—supervisory service 302 may also be responsible for specifying security policies for network 300, such as by preventing a certain endpoint from communicating with another endpoint, etc.
- Network Monitoring—supervisory service 302 may also receive telemetry data collected from network 300, allowing supervisory service 302 to assess and report on the health of network 300.
- Device Configuration—supervisory service 302 may also configure the networking devices in network 300, such as by pushing software updates to networking devices 306a-306i, As noted above, a ring network affords additional resiliency against a link failure. For instance, assume that the link between networking device 306a and networking device 306c is severed. In such a case, networking device 306a can still communicate with networking device 306c by sending its traffic in the opposite direction via networking device 306b, networking device 306d, and networking device 306e.

Traditionally, to ensure fast convergence in the case of a link failure in a ring network, the networking devices may employ the use of a ring-control protocol, such as the Spanning Tree Protocol (STP), Resilient Ethernet Protocol (REP), Media Redundancy Protocol (MRP), or the like. For instance, Networking devices 306a-306i may use REP to handle link failures and ensure quick network convergence, through the control over their ports. More specifically, under REP, at least one port of a networking device may be designated as an alternate port and placed into a blocked state for each Virtual LAN (VLAN). When a link failure is detected, the alternate port can be activated, thereby ensuring connectivity.

A key observation herein is that the convergence time afforded by traditional ring-control protocols often depends on the detection of the link failure and on the size of the rink network. For larger-scale ring networks, this can lead to unsatisfactory convergence times. This can often lead to a network architect having to make a tradeoff between the size of the ring network and the maximum convergence time that it can achieve. Indeed, in many OT networks, the following conditions should be met:

- Convergence time should be less than approximately 50 ms for large-scale ring networks.
- Bandwidth utilization by the convergence mechanism should be kept to a minimum.
- Central Processing Unit (CPU) utilization for the convergence mechanism should also be kept to a minimum.

Network Convergence Mechanism for Ring Networks

The techniques herein introduce a large scale ring convergence (LSRC) mechanism for ring networks that satisfy the above criteria and independent of the size of the ring network and the speed of its links. In some aspects, any networking device in the ring network is able to detect a link failure and initiate ring repair. This results in a bounded convergence time for the ring network.

Illustratively, the techniques described herein may be performed by hardware, software, and/or firmware, such as in accordance with ring convergence process 248, which may include computer executable instructions executed by the processor 220 (or independent processor of interfaces 210) to perform functions relating to the techniques described herein.

Figure 4A:
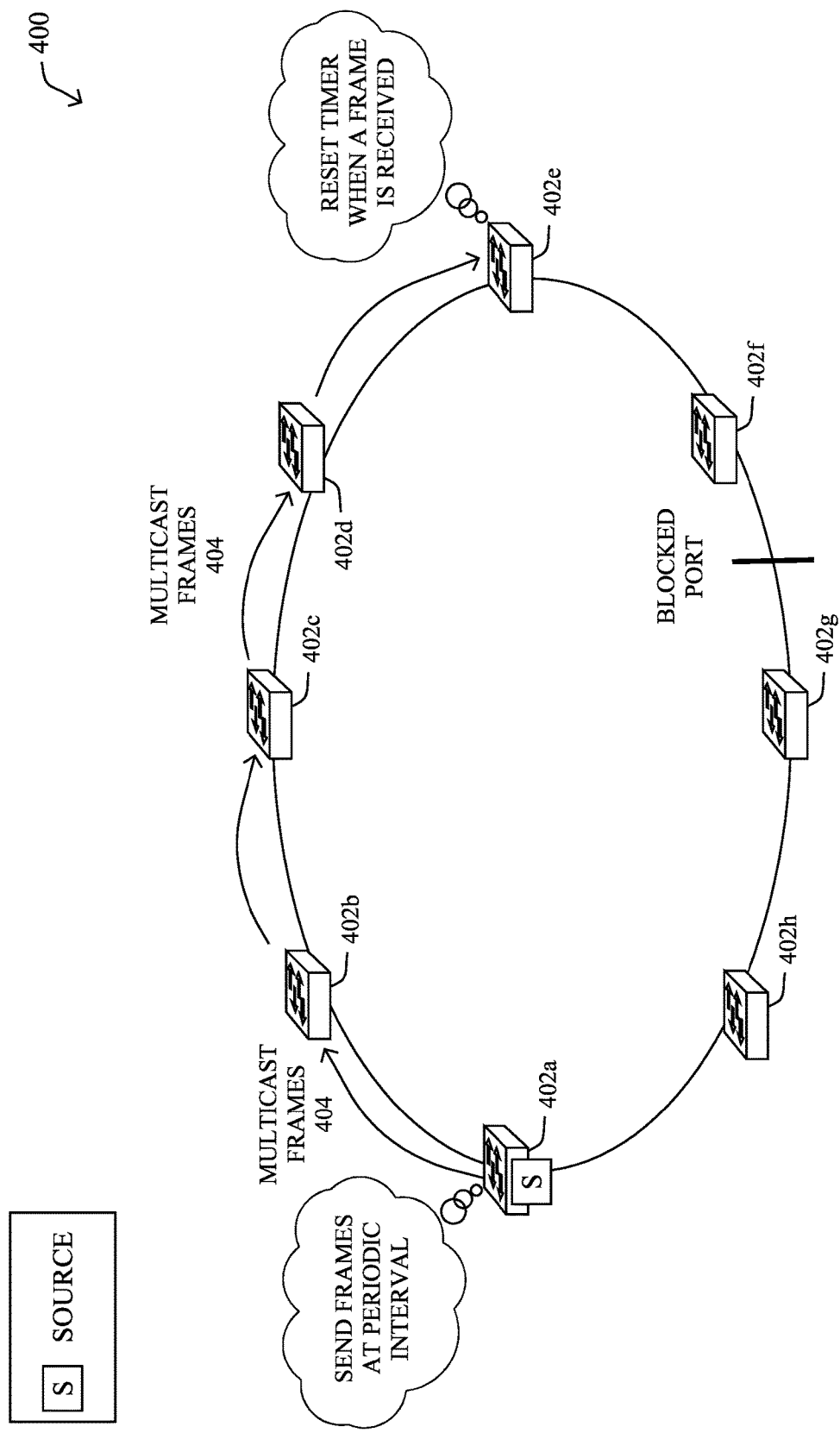
FIGS. 4A-4B illustrates an example of the detection of a failure in a ring network.
Figure 4B:
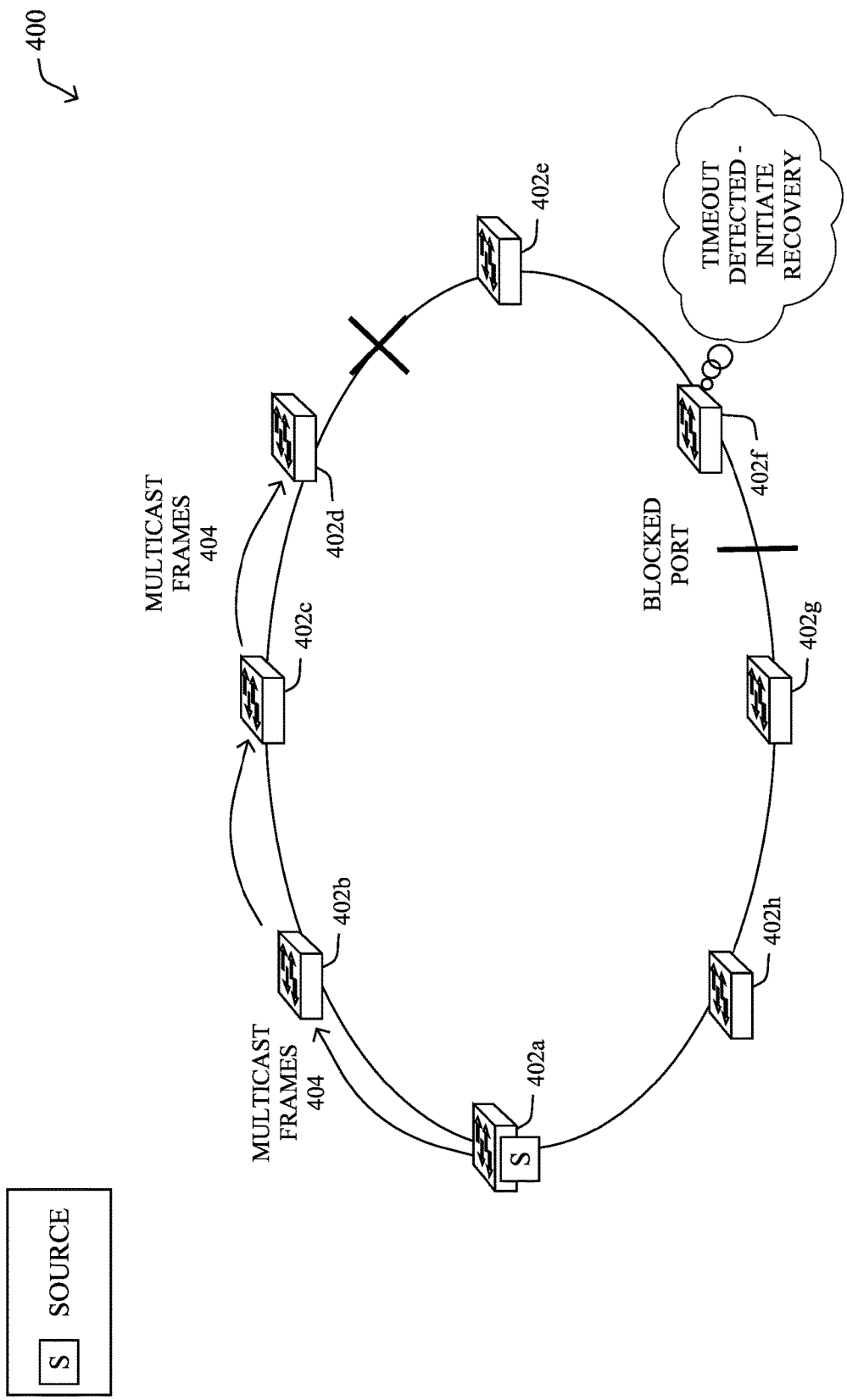

Specifically, according to various embodiments, FIGS. 4A-4B illustrates an example of the detection of a failure in a ring network. As shown in FIG. 4A, assume that there is a ring network 400 that comprises networking devices 402, such as networking devices 402a-402h, shown. As would be appreciated, ring network 400 may be part of a larger network (e.g., an OT network, etc.).

According to various embodiments, a device in ring network 400 may be designated as a source node for the ring convergence mechanism for ring network 400. For instance, as shown, assume that networking device 402a is designated as the source node for the ring convergence mechanism. In various embodiments, this designation may be made by a supervisory service (e.g., supervisory service 302, etc.), as a random designation, based on the characteristics of the selected device (e.g., in terms of its hardware, software, location, etc.), or the like.

In general, it is the function of the designated source node to send multicast frames 404 into ring network 400 at periodic intervals. Typically, networking device 402a will send multicast frames 404 as unidirectional messages through one of its ports, once the topology of ring network 400 is stable. For instance, as shown, assume that networking device 402a sends multicast frames 404 every 3 ms along the path comprising networking device 402b, networking device 402c, networking device 402d, networking device 402e, etc.

According to various embodiments, any or all of the networking devices in ring network 400 may also be configured as detectors that monitor ring network 400 for multicast frames 404. To do so, they may each maintain an internal timer that is set for a threshold amount of time. Whenever the networking device 402 receives a multicast frame 404, it may reset its timer. For instance, as shown in FIG. 4A, say a particular networking device in ring network 400, such as networking device 402e, receives one of multicast frames 404 before the expiration of its timer. In such a case, networking device 402e may reset its timer and monitor ring network 400 for a subsequent multicast frame 404.

In some cases, ring network 400 may also include a blocked port that can be unblocked in the case of a link failure. For instance, assume that the link between networking device 402f and networking device 402g is designated as being on a blocked port. In various embodiments, multicast frames 404 may still be conveyed via the blocked port, so as to circumnavigate ring network 400. Thus, in some embodiments, networking device 402a may also function as a detector with respect to multicast frames 404.

Assume now that the link between networking device 402d and networking device 402e fails, as shown in FIG. 4B. In such a case, in various embodiments, the other networking devices along the path may each determine that a link failure has occurred, based on that device not receiving multicast frame 404 before expiration of the internal timer of that device. For instance, consider the case of networking device 402f. If networking device 402f does not receive multicast frame 402 within the span of its timer, it may determine that a link failure has occurred within ring network 400. In turn, networking device 402f may initiate a corrective measure, such as by unblocking the port that it shares with networking device 402g. In doing so, traffic destined for networking device 402d can then be sent in the opposite direction and across the now unblocked port between networking device 402f and networking device 402g, thereby avoiding the failed link between networking device 402d and networking device 402e. Other corrective measures may include, for instance, generating an alert that is sent to a network administrator regarding the detection of the failed link.

Typically, the threshold amount of time for any given timer of a networking device 402 in ring network 400 will be greater than, or at least equal to, the periodicity at which networking device 402a sends multicast frames 404. However, in further embodiments, the threshold amount of time may even be greater than, or equal to, a multiple of that periodicity. For instance, assume that networking device 402a sends multicast frames 404 every 3 ms, periodically. In such a case, setting the timer thresholds for the networking devices 402 in ring network 400 to 10 ms will ensure that, at most, detection of a failed link in ring network 400 will take 10 ms. Since the networking device detecting a link failure is also able to initiate corrective measures/ring repair, this means that the failure detection and convergence time are not dependent on the size of ring network 400. In other words, in contrast to other ring convergence mechanisms, the techniques herein are particularly well-suited for large ring networks.

By way of illustration of the advantages of the techniques herein, consider the operation of the REP protocol. In REP, for instance, hardware flood layer (HFL) messages are flooded into the network, when a link failure is detected. Similarly, MRP uses test frames and topology change messages from a centralized point. Both of these approaches increase bandwidth and CPU utilizations, considerably, when compared to the techniques herein.

Figure 5A:
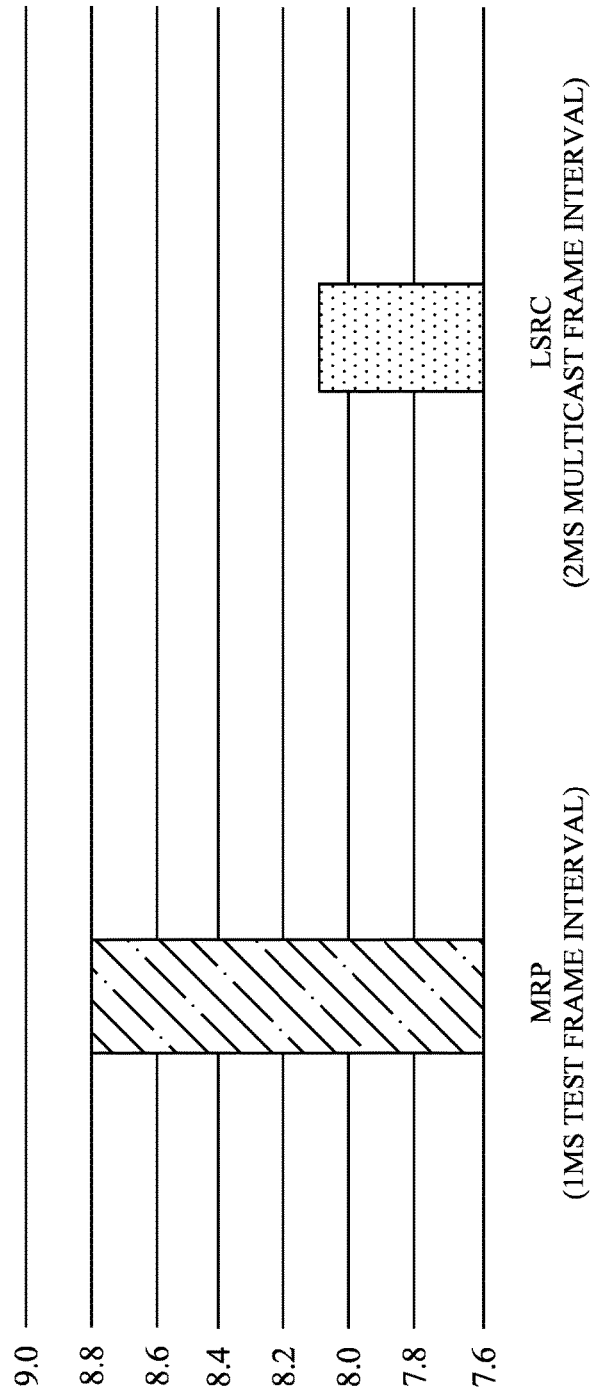
FIGS. 5A-5C illustrates plots comparing ring convergence techniques.
Figure 5B:
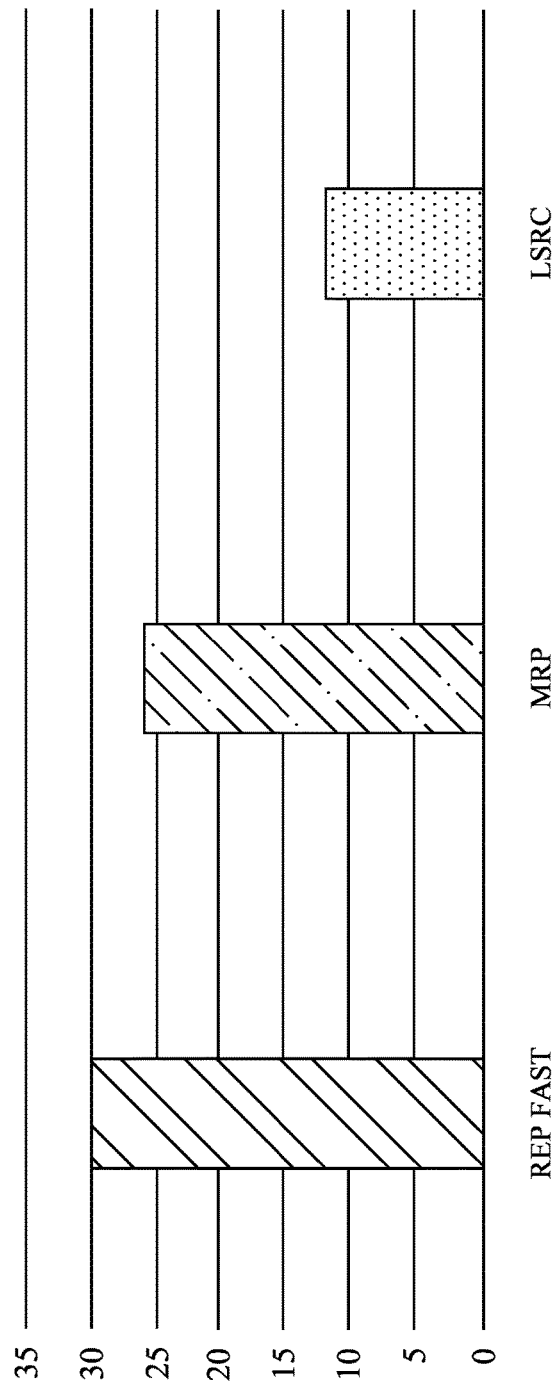
Figure 5C:
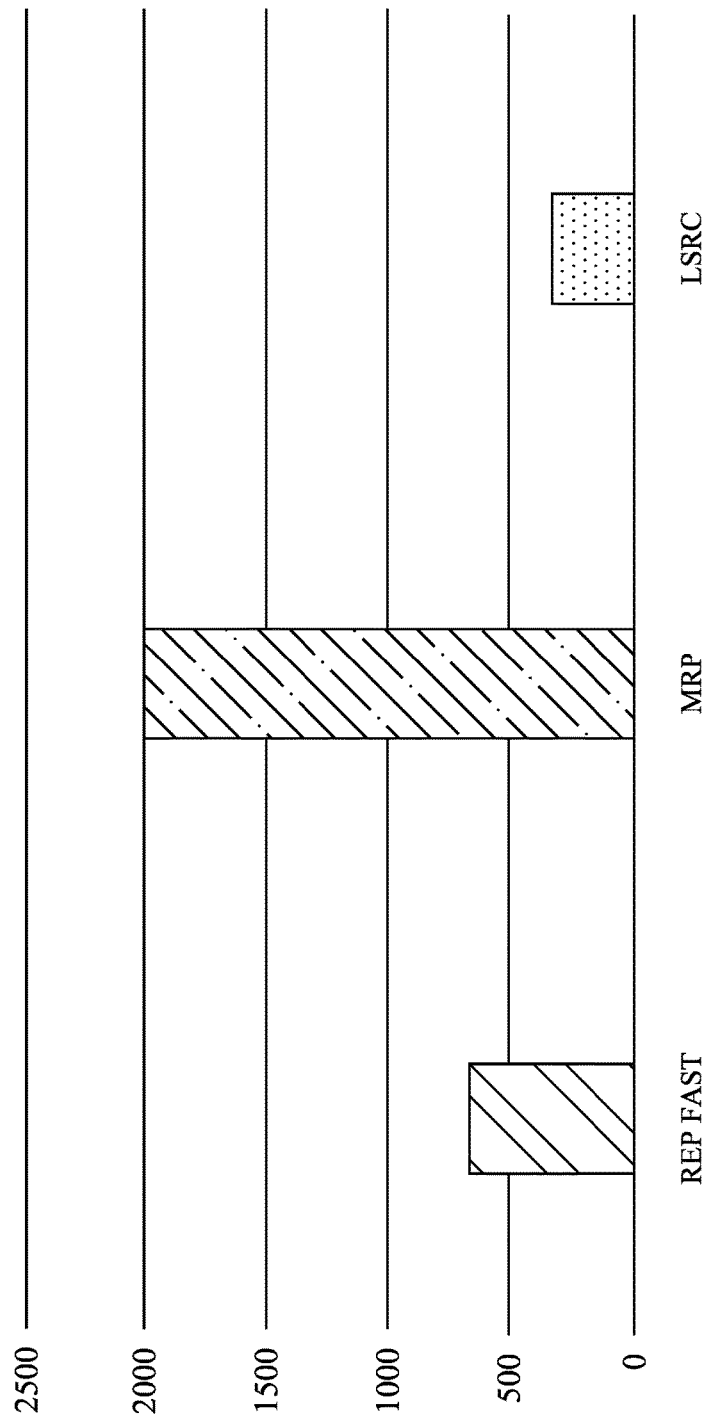

FIGS. 5A-5C illustrates plots comparing ring convergence techniques, according to various embodiments. More specifically, FIG. 5A illustrates a plot 500 of the convergence times for MRP and the LSRC mechanism introduced herein for a ring comprising 14-nodes/networking devices. For illustrative purposes, a 1 ms test frame interval was set for MRP and a 2 ms multicast transmit interval was set for the LSRC mechanism.

As would be appreciated, MRP reacts to a link failure only if Test frames are not received for a configured period of time, which is the total amount of time a Test frame takes to travel through the whole ring. Thus, under MRP, the convergence time increases with the number of nodes in the ring.

The convergence time under MRP is as follows:

$$Trec = MRP\_TST\text{default}T * MRPTSTNR \max + 2*N* (T\text{switch} + T\text{queue} + T\text{bit} + T\text{line}) + TFDB + T\text{hold}$$

Accordingly, in a 14-node ring network with a 1 ms Test frame interval, the convergence time will be $$Trec = 1 \text{ ms} * 3 + 2 * 14 * (10 \text{ ms} + 122 \text{ ms} + 5.12 \text{ ms}) + 0.5 \text{ ms} + 1.5 \text{ ms} = 8.8 \text{ ms}$$

In contrast, assume that the LSRC mechanism introduced herein is used in the same 14-node ring network and using a 2 ms multicast message interval. In such a case, the convergence/recovery time (Trec) is as follows:

$$Trec = 2 \text{ ms} * 3 + (10 \text{ ms} + 122 \text{ ms} + 5.12 \text{ ms}) + 0.5 \text{ ms} + 1.5 \text{ ms} = 8.13 \text{ ms}$$

While the improvement in convergence time is slight in the case of a 14-node, the differences between the LSRC mechanism herein and protocols such as MRP and REP FAST become even more noticeable in larger-scale ring network. For instance, consider the case of a 50-node ring.

FIG. 5B illustrates a plot 510 of the convergence times for REP FAST, MRP, and the LSRC mechanism, respectively.

As shown in plot 510, REP FAST will exhibit a convergence time of 30 ms in the 50-node ring network. MRP, however, will exhibit a worst-case convergence time of 26.2 ms, which can be calculated as follows:

$$Trec=3.5 \text{ ms}*3+2*50(10 \text{ ms}+122 \text{ ms}+5.12 \text{ ms})+0.5 \text{ ms}+1.5 \text{ ms}=26.2 \text{ ms}$$

In sharp contrast, the LSRC mechanism introduced herein will exhibit a constant convergence time of 12.1 ms, as follows:

$$Trec=3 \text{ ms}*3+(10 \text{ ms}+122 \text{ ms}+5.12 \text{ ms})+0.5 \text{ ms}+1.5 \text{ ms}=12.1 \text{ ms}$$

This means that the LSRC mechanism will result in an approximately 53% improvement over MRP for the convergence time in a 50-node ring network. Likewise, there is an approximately 60% improvement, over REP FAST. The reason for this improvement is that the networking devices in the ring network do not have to wait for topology change messages from a singular detector node before flushing their tables.

The LSRC mechanism also provides better performance in terms of resource consumption, such as CPU usage by a networking device in the ring network. For instance, in the case of REP FAST, beacon packets are sent every 3 ms per ring port, meaning that the CPU of a networking device has to process ~660 packets/second. In contrast, the LSRC mechanism herein requires only ~330 packets/second per ring with respect to the sending node. For the other nodes in the network, there is typically no additional CPU overhead, as the standard mechanism would be to simply forward the multicast frames in hardware.

Bandwidth utilization is also reduced using the LSRC mechanism herein, in comparison to existing ring management protocols. For instance, FIG. 5C illustrates an example plot 520 showing the relative bandwidth utilization of REP FAST, MRP, and the LSRC mechanism introduced herein. As noted previously, REP FAST sends beacon packets every 3 ms per ring port, resulting in approximately 660 packets/second being sent over that link. To achieve a 10 ms recovery time, MRP requires a topology change request to be sent every 0.5 ms, resulting in 2000 packets/second being sent. Thus, the LSRC mechanism introduced herein is able to achieve a similar recovery time, but with a greatly reduced bandwidth utilization.

Operationally, the techniques herein introduce the concept of a ring manager that comprises an application or other piece of software that can be hosted and executed by a networking device. Indeed, many network switches now include the ability to host applications that can be executed in a container, virtual machine (VM), or the like.

Figure 6:
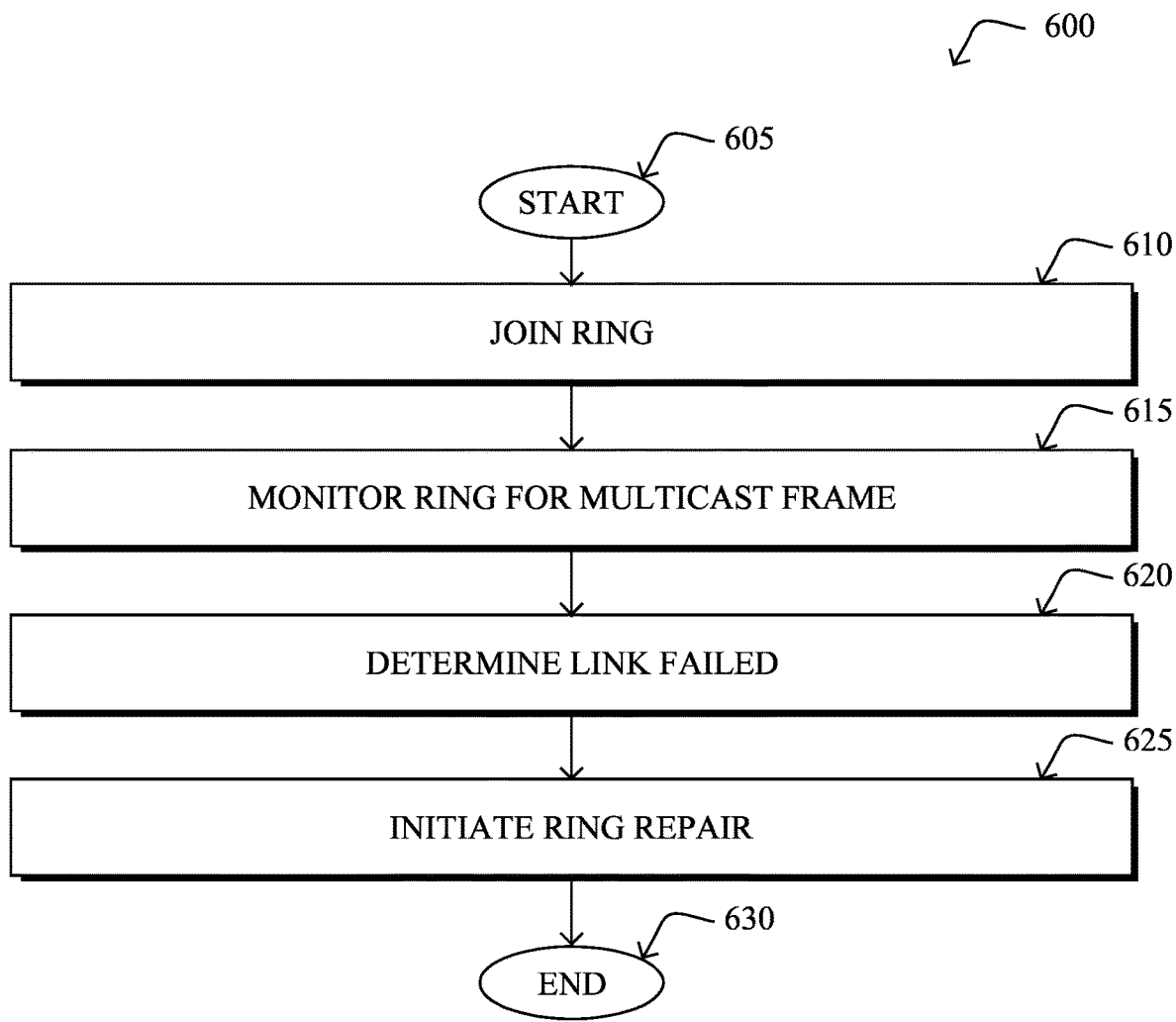
FIG. 6 illustrates an example simplified procedure for initiating repair of a ring network.

FIG. 6 illustrates an example simplified procedure for initiating repair of a ring network, in accordance with one or more embodiments described herein. In various embodiments, a non-generic, specifically configured networking device (e.g., device 200) may perform procedure 600 by executing stored instructions (e.g., process 248). For instance, a particular networking device, such as an Ethernet switch, etc., may perform procedure 600. The procedure 600 may start at step 605, and continues to step 610, where, as described in greater detail above, the particular networking device may join a ring network of networking device that has a ring topology. For instance, the ring network may take the form of an Ethernet ring of Ethernet switches.

At step 615, as detailed above, the particular networking device may monitor the ring network for a multicast frame used within the ring network to detect link failures. In various embodiments, the multicast frame may be sent into the ring network at a periodic interval and may be sent as a unidirectional frame. In one embodiment, the particular networking device may send the multicast frame into the ring network. In other embodiments, one of the other networking devices in the ring network may be designated as a source node to send the multicast frame into the ring network at the periodic interval. While monitoring the ring network for the multicast frame, the particular networking device may also increment a timer that is set for a threshold amount of time and, if it receives the multicast packet, rest its timer.

At step 620, the particular networking device may determine that a link in the ring network has failed, based on the particular networking device not receiving the multicast frame within a threshold amount of time, as described in greater detail above. Indeed, if the particular networking device does not receive a periodically-sent multicast frame within the threshold amount of time, it may determine that its link with a neighboring device in the ring network has failed or another link along the path between itself and the sender of the multicast frame has failed. Accordingly, the threshold amount of time may be greater than, or equal to, the periodic interval. If so desired, the periodic interval may be equal to, or greater than, a multiple of the periodic interval. For instance, if the multicast frame is sent every 3 ms, the threshold amount of time may be set to 10 ms.

At step 625, as detailed above, the particular networking device may initiate repair of the ring network, when it determines that the link in the ring network has failed. For instance, the particular networking device may cause a blocked port in the ring network to become unblocked. In doing so, traffic in the ring network can be sent in the opposite direction and across the now unblocked port, to reach the particular networking device, thereby avoiding the failed link. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for very fast convergence of a ring network in the presence of a link failure. Since any device in the ring network is able to detect a link failure using the techniques herein, the convergence time for the network is not a function of the number of networking devices in the ring network, making the techniques herein particularly well-suited for large-scale ring network. More specifically, the techniques herein provide for faster convergence in large-scale networks, achieves faster link down detection and convergence times less than 50 ms, reduce bandwidth utilization in comparison of other convergence mechanisms, and improves the performance of the networking devices in the ring network by requiring fewer computing resources.

While there have been shown and described illustrative embodiments for a ring convergence mechanism to detect link failures and initiate repair of the ring network, it is to be understood that various other adaptations and modifications may be made within the intent and scope of the embodiments herein. For instance, while the techniques herein are primarily described with respect to an Ethernet ring, the techniques herein are not limited as such and can be applied to any form of communication network that uses a ring topology.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
    joining, by a particular networking device, a ring network of networking devices that has a ring topology;
    monitoring, by the particular networking device, the ring network for a multicast frame used within the ring network to detect link failures;
    determining, by the particular networking device, that a link in the ring network has failed, based on the particular networking device not receiving the multicast frame within a threshold amount of time; and
    initiating, by the particular networking device, repair of the ring network, when the particular networking device determines that the link in the ring network has failed.

2. The method as in claim 1, wherein the networking devices in the ring network are Ethernet switches.

3. The method as in claim 1, wherein initiating repair of the ring network comprises:
    causing a blocked port in the ring network to become unblocked.

4. The method as in claim 1, wherein the multicast frame is sent into the ring network at a periodic interval.

5. The method as in claim 4, wherein the threshold amount of time is greater than, or equal to, the periodic interval.

6. The method as in claim 5, wherein the threshold amount of time is equal to, or greater than, a multiple of the periodic interval.

7. The method as in claim 4, wherein one of the networking devices in the ring network is designated as a source node to send the multicast frame into the ring network at the periodic interval.

8. The method as in claim 1, wherein monitoring the ring network for the multicast frame used within the ring network to detect link failures comprises:
    restarting a timer set for the threshold amount of time, in response to receiving the multicast frame.

9. The method as in claim 1, wherein the multicast frame is a unidirectional frame in the ring network.

10. The method as in claim 1, wherein the particular networking device sent the multicast frame.

11. An apparatus, comprising:
    one or more interfaces to communicate with a ring network of networking devices that has a ring topology;
    a processor coupled to the one or more interfaces and configured to execute one or more processes; and
    a memory configured to store a process that is executable by the processor, the process when executed configured to:
        join the ring network of networking devices;
        monitor the ring network for a multicast frame used within the ring network to detect link failures;
        determine that a link in the ring network has failed, based on the apparatus not receiving the multicast frame within a threshold amount of time; and
        initiate repair of the ring network, when the apparatus determines that the link in the ring network has failed.

12. The apparatus as in claim 11, wherein the networking devices in the ring network are Ethernet switches.

13. The apparatus as in claim 11, wherein the apparatus initiates repair of the ring network by:
    causing a blocked port in the ring network to become unblocked.

14. The apparatus as in claim 11, wherein the multicast frame is sent into the ring network at a periodic interval.

15. The apparatus as in claim 14, wherein the threshold amount of time is greater than, or equal to, the periodic interval.

16. The apparatus as in claim 15, wherein the threshold amount of time is equal to, or greater than, a multiple of the periodic interval.

17. The apparatus as in claim 14, wherein one of the networking devices in the ring network is designated as a source node to send the multicast frame into the ring network at the periodic interval.

18. The apparatus as in claim 11, wherein the apparatus monitors the ring network for the multicast frame used within the ring network to detect link failures by:
    restarting a timer set for the threshold amount of time, in response to receiving the multicast frame.

19. The apparatus as in claim 11, wherein the multicast frame is a unidirectional frame in the ring network.

20. A tangible, non-transitory, computer-readable medium storing program instructions that cause a particular networking device to execute a process comprising:
    joining, by the particular networking device, a ring network of networking devices that has a ring topology;
    monitoring, by the particular networking device, the ring network for a multicast frame used within the ring network to detect link failures;
    determining, by the particular networking device, that a link in the ring network has failed, based on the particular networking device not receiving the multicast frame within a threshold amount of time; and
    initiating, by the particular networking device, repair of the ring network, when the particular networking device determines that the link in the ring network has failed.

* * * * *